United States Patent [19]

Ender

[11] Patent Number: 4,530,181
[45] Date of Patent: Jul. 23, 1985

[54] ATTACHMENT DEVICE FOR AN AUXILIARY FISHING LINE

[76] Inventor: Dale R. Ender, R.R. #2, Buchanan, Mich. 49107

[21] Appl. No.: 534,726

[22] Filed: Sep. 22, 1983

[51] Int. Cl.³ ............................................. A01K 91/06
[52] U.S. Cl. .................................. 43/44.88; 43/44.91
[58] Field of Search ............... 43/27.4, 44.9, 44.87, 43/43.12, 43.1, 44.83, 44.84, 44.85, 44.88, 44.91

[56] References Cited

U.S. PATENT DOCUMENTS 4,177,599 12/1979 Petterson ........................... 43/43.12
4,221,068 9/1980 Roemer .............................. 43/43.12

OTHER PUBLICATIONS

Fathom Master-Penn Fishing Tackle Mfg. Co., Philadelphia, Pa. (Great Lakes Steelheader Newspaper) Jun. 21, 1983.

Primary Examiner—Nicholas P. Godici
Assistant Examiner—C. McKee
Attorney, Agent, or Firm—Marmaduke A. Hobbs

[57] ABSTRACT

A device for attaching an auxiliary fishing line to a primary fishing line, for use while trolling, with the primary fishing line connected to the ball of a downrigger assembly. The auxiliary line is slidably mounted on the primary line and the device is used to hold the auxiliary line on the primary line at a selected position. The auxiliary line remains separate from the primary line while trolling, enabling fishermen to fish with separate lines from a single rod while avoiding entanglement of the lines. When a fish strikes either line, the device slides to the end of the primary line, allowing both lines and the fish to be reeled completely in.

9 Claims, 6 Drawing Figures

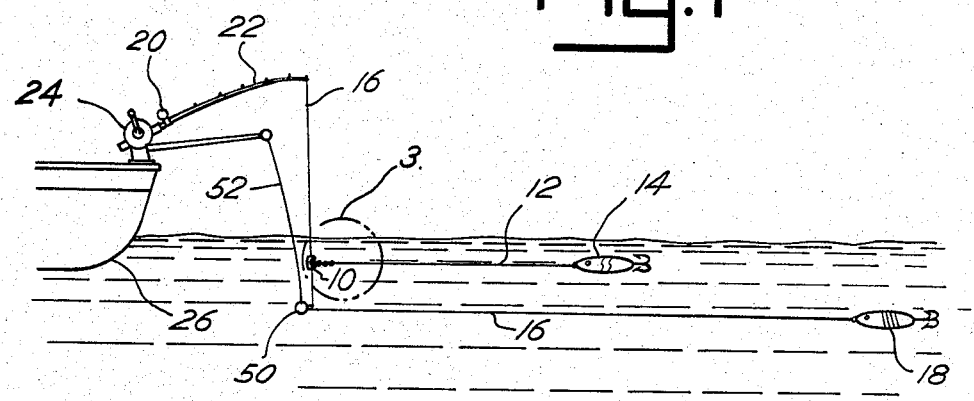
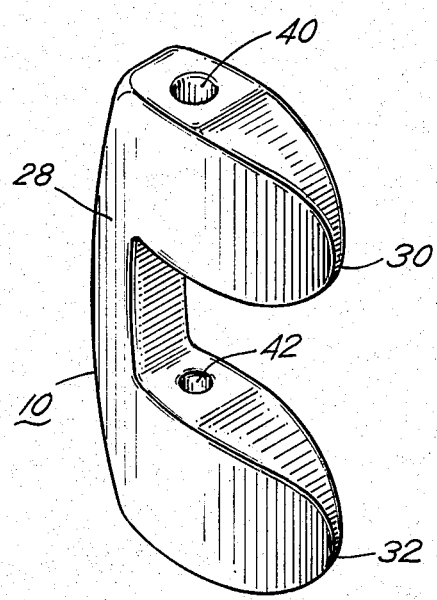
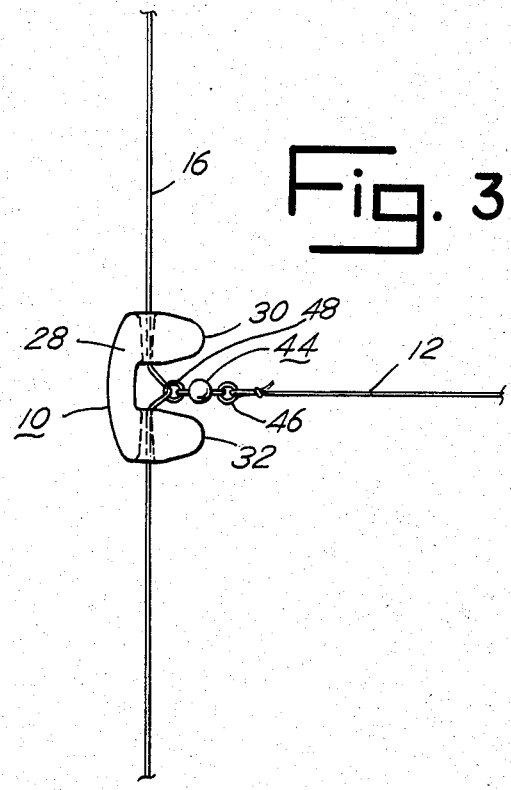

ATTACHMENT DEVICE FOR AN AUXILIARY FISHING LINE

BACKGROUND OF THE INVENTION

Much fishing is done from the stern or rear end of a slowly moving boat, a procedure known as trolling. One drawback to fishing using this procedure is that the forward motion of the boat tends to straighten and raise the fishing line and its attached bait or lure, the result being that only fish near the surface of the water are attracted to the lure. Since many fish do not venture near the water's surface, due to factors such as the additional warmth of the water temperature, habitat, increased light intensity, and others, catching deep-water fish has been possible only from a stationary boat or pier. The success of the trolling procedure, however, stems from the attractiveness to fish of a moving lure. These problems have been alleviated by the use of devices known as downriggers. A downrigger is a device that allows one to fish at a certain selected depth while trolling. The hook is attached and baited, or a lure is attached to a primary fishing line emanating from a rod and reel assembly, and is then let out behind the boat a certain desired distance. The fishing line is then releasably fastened to a heavy or weighted ball which is lowered the desired distance into the water. The ball normally weighs approximately ten pounds and is fastened to a steel cable which can be as much as six hundred feet in length. The ball remains at approximately the depth selected and drags the lure along behind the boat at the depth of the ball.

When a fish strikes the lure, the fishing line is released from the ball and the fisherman takes control to land the fish. The ball is returned to the downrigger assembly, automatically or by reeling in the cable by hand, ready for the next attempt. This allows some selection over what species of fish is caught, since it is generally known by experienced fishermen, or local conservation officers, at what approximate depth certain species of fish swim. The downrigger also allows fishing along the bottom or a few feet from the bottom in bodies of water having known depths, and one can select with reasonable accuracy the fishing depth and the species of fish desired.

Most fishermen endeavor to increase their catch, or at least their chances of catching fish, and one procedure followed is the attachment of multiple lines and hooks or lures to the primary fishing line. The rationale varies, but, in general, it is believed that multiple lures are better than one, and multiple baits give to the targeted species the impression of a school of possible food, thereby increasing the attractiveness to the fish. Most states, however, have codes applicable to fishing in inland waters within or adjacent their boundaries and limit the number of lines, or the number of hooks or lures, which may be attached to each primary line emanating from a single rod. Michigan, for example, generally limits each person to no more than two lines and no more than four hooks on all lines. Indiana, as another example, generally limits each person to no more than three lines, and no more than two hooks or lures per line. Thus, many devices and methods have been tried for attaching additional leaders or lines to a primary line. Some of the aforementioned devices or methods include swivel snaps, alligator clips, rubber bands, or simple knots for tying an auxiliary line to a primary line. In some cases, auxiliary lines have even been hooked to the downrigger cable, but the results have been less than satisfactory with any of the above devices or methods. Where two or more lines are used with a single rod, the inability to control the separation of the lines usually results in tangled lines, broken lines, escaped fish, or fish that must be pulled in by hand where the primary line can not be reeled in due to the engagement of the swivel snap, knot, or alligator clip with the eye or guide member at the tip of the fishing rod.

SUMMARY OF THE INVENTION

It is, therefore, one of the principal objects of the present invention to provide a device for attaching an auxiliary fishing line to a primary fishing line, designed for use with a downrigger, which allows the fisherman to fish from a single rod with two separate lines set at selected depths, and eliminates any tangling of the two lines, and which provides an effective positioning means on the primary line at the depth selected for the auxiliary line.

Another object of the present invention is to provide a device for attaching an auxiliary fishing line to a primary fishing line, which is simple in construction and easy to operate, and which provides fishermen with greater chances to increase their catch, and assists in reeling in a catch.

A further object of the present invention is to provide a device for attaching an auxiliary fishing line to a primary fishing line, which is easy to use and which provides efficient operation in use, which is durable to provide a long service life, and which is inexpensive to produce.

A still further object of the present invention is to provide a device for attaching an auxiliary fishing line to a primary fishing line, which is easily attached to the primary line and which, upon catching a fish on either the primary line or the auxiliary line, moves to the end of the primary line so that both lines can be completely reeled in.

These and other objects are attained by the present invention which relates to a device for attaching an auxiliary fishing line to a primary fishing line, the device having a generally U-shaped body member with aligned holes or passages through the arms of the body, for receiving the primary fishing line. The auxiliary line is slidably attached to the primary line near the center of the device in the area defined by the U-shape. When used with a downrigger assembly, the primary line has basically two positions, a substantially vertical position assumed before a fish strikes either the primary or the auxiliary line, and a substantially horizontal position assumed after a fish has struck either the primary or the auxiliary line. With the primary line in a vertical position, the device locks the auxiliary line on the primary line at a selected position, and once a fish strikes and the primary line assumes a substantially horizontal position, the device, slides to the end of the primary line, thereby eliminating or minimizing tangling of the separate lines.

BRIEF DESCRIPTION OF THE DRAWINGS

FIG. 1 is a side elevational view of an attachment device for an auxiliary fishing line embodying the present invention, shown here attached to a primary fishing line which extends from the fishing rod, the rod being mounted in a downrigger assembly which is secured to the stern of the boat;

FIG. 2 is an enlarged perspective view of the attachment device embodying the present invention, shown here apart from its installed position;

FIG. 3 is a side elevational view of the attachment device embodying the present invention, the view being taken from circle 3 in FIG. 1;

DETAILED DESCRIPTION OF THE PREFERRED EMBODIMENT

Figure 4:
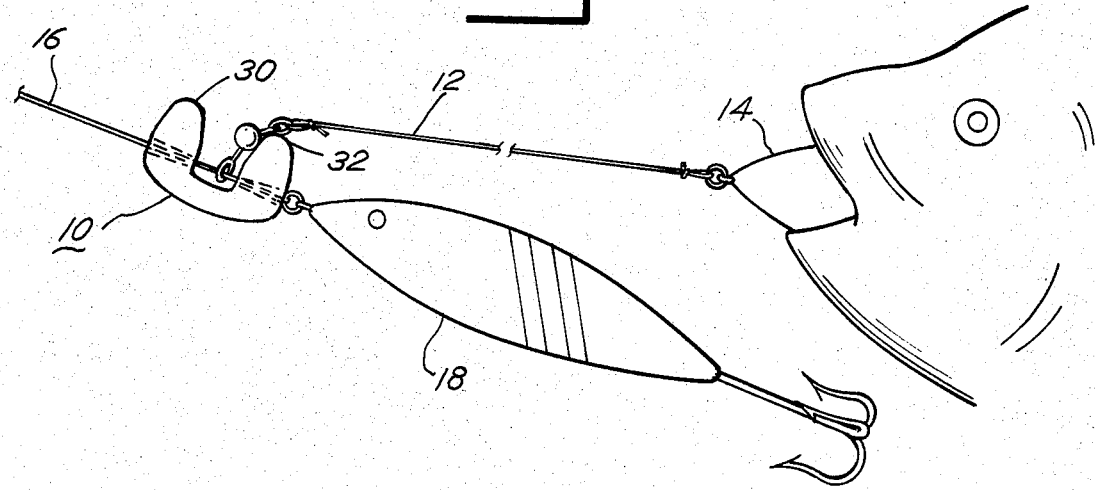
FIG. 4 is a side elevational view of the positions assumed by the present attachment device, the auxiliary fishing line, and the primary fishing line, upon catching a fish.
Figure 5:
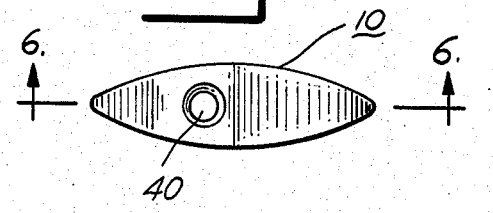
FIG. 5 is an end elevational view of the present attachment device.
Figure 6:
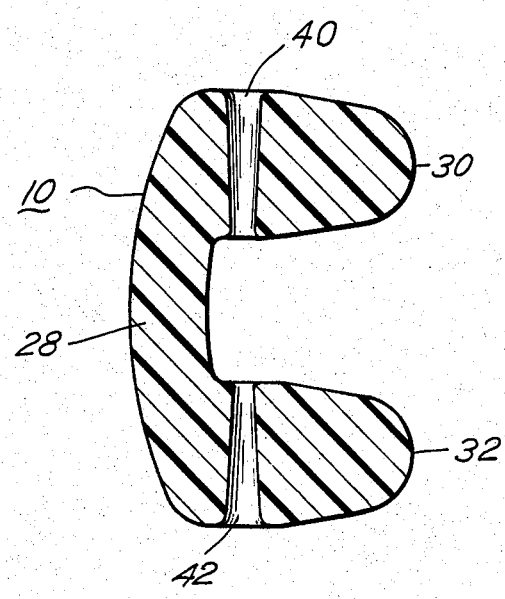
FIG. 6 is a cross-sectional view of the present attachment device illustrating the holes or passages therein for receiving the primary fishing line, the section being taken on line 6—6 of FIG. 5.

Referring more specifically to the drawings, and to FIG. 1 in particular, numeral 10 designates generally the attachment device embodying the present invention, the device being shown in circle 3 of FIG. 1. The device 10 is shown attaching an auxiliary fishing line 12 and an auxiliary lure 14 to a primary fishing line 16 with its primary lure 18. The primary line extends from a fishing reel 20 mounted on a fishing rod 22, and the fishing rod is inserted into a holder in a downrigger assembly 24. The present device has been designed for use with a downrigger or a downrigger-type assembly and is used while trolling from a moving craft, such as a boat 26.

The attachment device is composed of a plastic or plastic-like material, which is non-abrasive to protect the fishing line. The device has an arcuate main body portion 28 with outwardly projecting upper arm 30 and lower arm 32. The generally U-shaped configuration of the device, and the gradually rounded and tapered outer surfaces of the device, help to keep the device properly oriented with the arms extending rearwardly while trolling with the device, as shown in FIGS. 1 and 3, thus minimizing the drag of the device itself. Extending through upper arm 30, parallel with the vertical axis of body member 28, is a hole or passage 40, and extending through lower arm 32, also parallel with the vertical axis of body member 28, is a hole or passage 42. Passages 40 and 42 taper inwardly from their outer ends in the top of arm 30 and the bottom of arm 32, respectively, toward the middle portion of the device. The taper has been designed as an aid in locking the device on the primary line. The openings at the outer ends of the passages have been slightly rounded to further guard against abrasion of the fishing line, while the inner edges of the passages, where they exit the arms near the middle portion of the device, are substantially straight as a further aid in locking the device on the primary line.

The auxiliary line 12, which can be of any desired length, for example, two to six feet, is measured and cut to the desired length. A lure 14 is fastened to one end of the auxiliary line, and a device, such as swivel snap 44, is fastened to the other end. The swivel snap has an eye on each end, eye 46 for connection to the auxiliary line 12 and eye 48 for receiving the primary line. The primary line 16 is then threaded, first through passage 40 of arm 30, then through eye 48 of the swivel snap, and then through passage 42 of arm 32. The attachment device 10 and the auxiliary leader are then free to travel up or down the primary line before the lines are let into the water. The primary line 16, emanating from the rod 22 and reel 20, is baited, using lure 18 or other bait, and the line is allowed to run out behind the boat to the distance desired for fishing. Upon reaching the selected distance, the primary line is releasably fastened to a weighted ball 50 which is fastened to a steel cable 52. The cable emanates from the downrigger assembly 24 which is normally mounted on the stern of a boat 26. The ball 50, normally weighing about ten pounds, is then lowered into the water the desired distance, which can be anywhere from a few feet to several hundred feet.

The attachment device with the auxiliary line and lure can then be thrown overboard at any place desired along the primary line. The pull of the water on the auxiliary lure, combined with the downward pull of the downrigger ball and the forward pull of the boat on the primary line, locks the attachment device on the primary line and holds it there, due to the equalized pulling forces, whereupon it trails the boat at that depth. The drag on the auxiliary line is not great enough to trip the downrigger release, due to the design configuration of the device, which minimizes its drag, and the tension setting on the downrigger ball. For example, if it is desired to fish with two lines and two lures, with the primary lure at a depth of approximately twenty feet and the auxiliary lure at a depth of approximately five feet, the weighted ball 50, with the primary line attached thereto, is lowered into the water. When the weighted ball reaches a depth of fifteen feet, as indicated by a depth counter on the downrigger reel, the attachment device 10 is thrown overboard. The resistance of the water on lure 14 locks the device on the primary line at that point, as shown in FIGS. 1 and 3, and the weighted ball is then lowered the additional five feet. The primary line then trails the weighted ball and the boat at a depth of approximately twenty feet, and the auxiliary line trails the boat at a depth of approximately five feet, about fifteen feet above the primary line. These distances are infinitely adjustable within the limits of the length of the downrigger cable, the length of the primary line, and the depth of the body of water. The lines extend separately behind the boat, thereby preventing tangling of the lines and the associated problems which normally lead to lost fish and lost time spent in untangling lines.

When a fish strikes auxiliary lure 14, the pull of the fish causes the primary line to release from the weighted ball. As the primary line straightens, the attachment device 10 slides to the end of the primary line, as shown in FIG. 4. The primary line can then be reeled completely in to the tip of the fishing rod, and the fish can be netted or landed with no tangling of the lines. Thus, the device allows one to fish with two lines but with the convenience and ease of fishing with one line. When a fish strikes the primary lure 18, the pull of the fish trips the release mechanism on the downrigger ball. As the primary line straightens, the attachment device slips to the end of the primary line, as in the first case, under the drag of the water on the auxiliary lure. With the auxiliary line then at the end of the primary line, the fish can be reeled in and netted, and the pull of the auxiliary lure in the water keeps the auxiliary line trailing the primary line and prevents its becoming entangled with the primary line while the fish is being removed from the hook on the primary line.

The device provides an efficient method of fishing with one or more auxiliary lines in connection with a primary line hooked to a downrigger-type assembly. Where more than one auxiliary line is permitted by applicable regulations, the devices can be threaded on the primary line and spaced at selected intervals as desired. Thus, the device enables a fisherman to fish with separate lines from a single rod while trolling, eliminates tangling of the separate lines, and enables the fisherman to concentrate on fishing and not on untangling lines and knots in the lines.

While one embodiment of an attachment device for auxiliary fishing lines has been shown and described in detail herein, various changes and modifications may be made without departing from the scope of the present invention.

I claim:

1. A primary and auxiliary fishing line assembly, comprising a body having a normally vertically disposed member and upper and lower arms extending in a spaced relation laterally from said member and forming a generally U-shaped configuration with said body member, passage means extending through each of said arms in alignment with one another, a primary fishing line extending singly through and slidably received in said passage means of said arms, an auxiliary fishing line having an end disposed adjacent said body, and an attachment means secured to said auxiliary line end and having a part with a hole therethrough slidably received on said primary fishing line in the space between said arms for pulling said main fishing line into a generally V-shaped configuration between said arms, thereby releasably locking said auxiliary line at any desired position on the main line for trolling.

2. A fishing line assembly as defined in claim 1 in which said passage means in said arms are disposed in close proximity to said body member and said passage means are substantially parallel to the vertical axis of said body member.

3. A fishing line assembly as defined in claim 2 in which said passage means in said upper arm includes an opening in the top surface of said upper arm with a rounded outer edge for protecting the fishing line, and said passage means in said lower arm includes an opening in the bottom surface of said lower arm with a rounded outer edge for protecting the fishing line, and the sides of said passages taper inwardly from said openings toward the center of said body member.

4. A fishing line assembly as defined in claim 3 in which said attachment means has an eye on the end thereof which is attached to a primary fishing line between said upper and lower arms, with the primary fishing line being slidably received in said eye, said primary fishing line having a substantially vertical position when connected to a downrigger assembly while trolling, and a substantially horizontal position when released from the downrigger.

5. A device for attaching an auxiliary fishing line to a primary fishing line, comprising a body member having arms extending laterally in spaced relation substantially perpendicular to the vertical axis of said body member and having passage means extending through said arms for receiving a primary fishing line, a connecting means on one end of the auxiliary line slidably connected to the primary fishing line between said arms, with said connecting means receiving the primary fishing line, said passage means in said arms being disposed in close proximity to said body member, and said passage means axially aligned and having sides that taper inwardly toward the center of said body member continuously over the length of said passage means to aid in locking said device on said primary line.

6. A device as defined in claim 5 in which said body member has a generally U-shaped configuration and is normally disposed vertically with one arm above the other, and said passage means extend substantially parallel to the vertical axis of said body member and in alignment with one another.

7. A fishing line assembly as defined in claim 1 in which said upper and lower arms extend substantially perpendicular to the vertical axis of said body member, and said passage means extend substantially parallel to the vertical axis of said body member.

8. A fishing line assembly as defined in claim 1 in which said passage means in said upper arm includes an opening in the top surface of said upper arm with a rounded outer edge for protecting the fishing line, and said passage means in said lower arm includes an opening in the bottom surface of said lower arm with a rounded outer edge for protecting the fishing line, and the sides of said passages taper inwardly from said openings toward the center of said body member.

9. A fishing line assembly as defined in claim 1 in which said primary line assumes a substantially vertical position when connected to a downrigger assembly while trolling and a substantially horizontal position when disconnected from the downrigger assembly, and said device remains at a certain selected position on the primary line when the primary line assumes the substantially vertical position and is freely slidable thereon when the primary line assumes the substantially horizontal position.

* * * * *